April 26, 1955  E. F. W. ALEXANDERSON  2,707,257
ALTERNATING-CURRENT MOTOR
Filed July 21, 1954  2 Sheets-Sheet 1
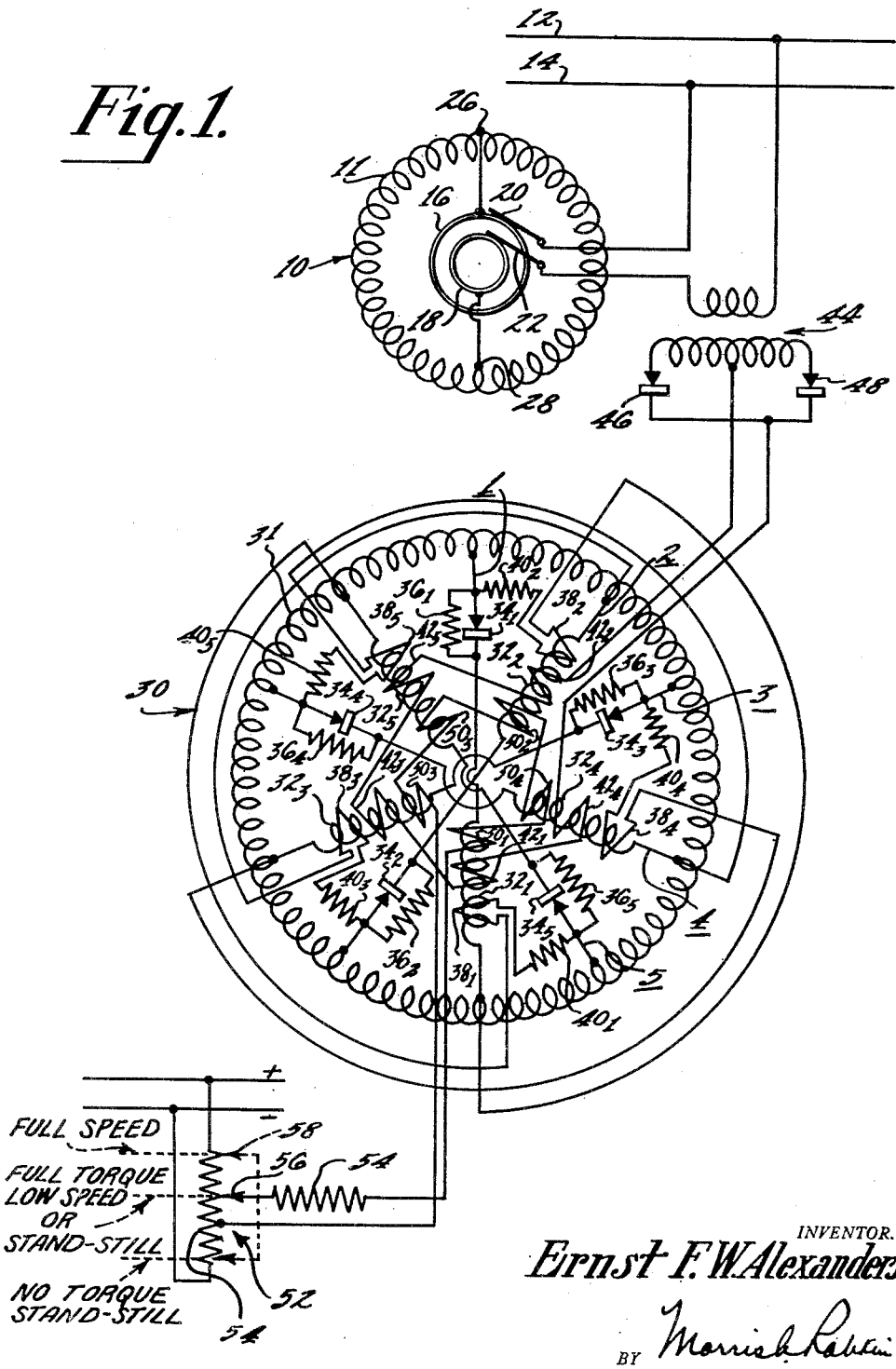
INVENTOR.
Ernst F. W. Alexanderson
BY Morris Liebmann
ATTORNEY

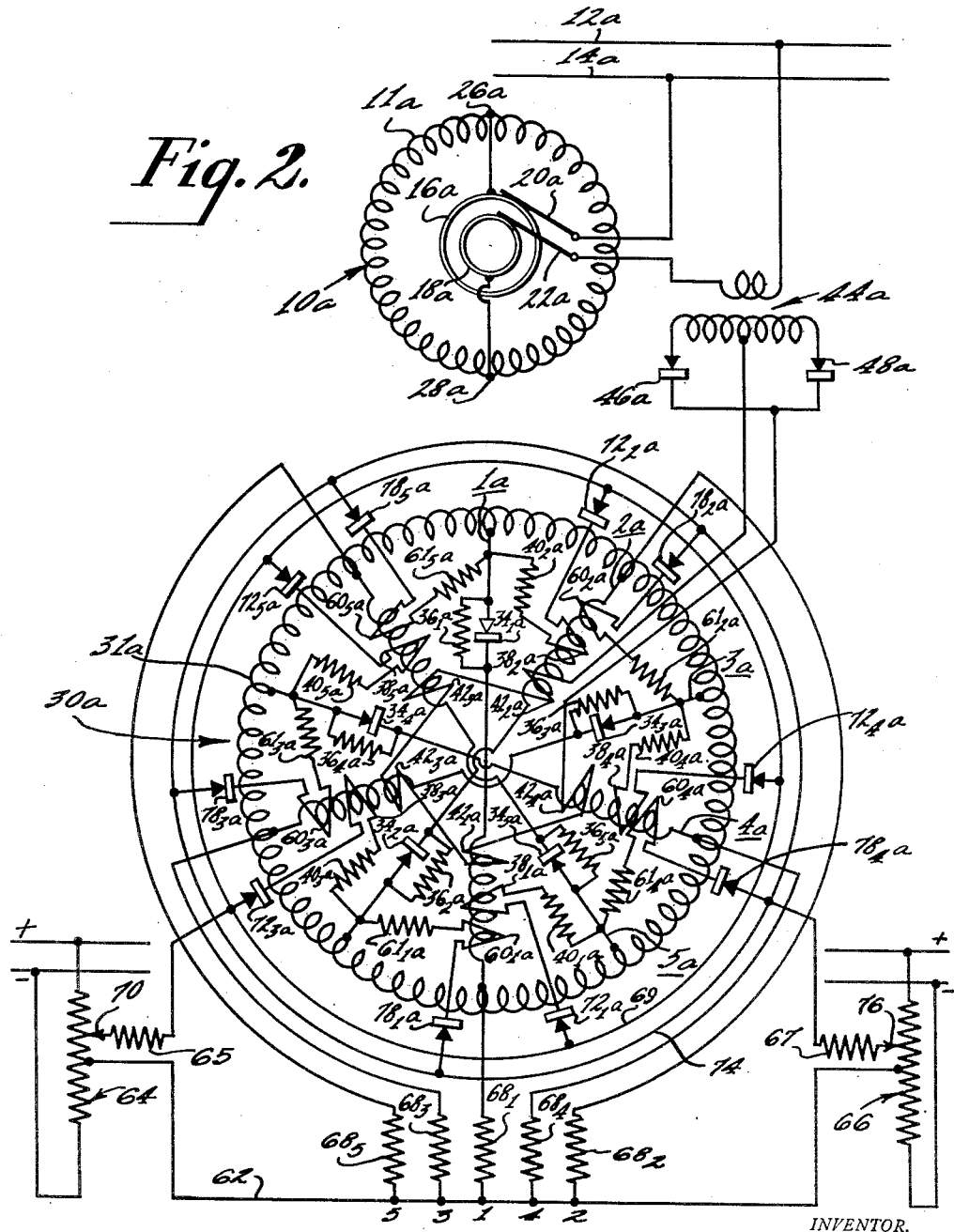

United States Patent Office 2,707,257
Patented Apr. 26, 1955

2,707,257

ALTERNATING-CURRENT MOTOR

Ernst F. W. Alexanderson, Schenectady, N. Y.

Application July 21, 1954, Serial No. 444,737

9 Claims. (Cl. 318—196)

This invention relates to alternating-current motors, and more particularly to, motors having the operating characteristics of repulsion-induction type alternating-current motors.

The ordinary repulsion-induction motor has a primary single-phase stator winding and a rotor winding with commutator and brushes. The rotor winding is short circuited through the brushes on an axis which is displaced from the axis of the primary winding. The interlinkage of the windings induces currents in the rotor by transformation. Repulsion between the stator and rotor ampere turns produces a torque. It usually has a squirrel-cage induction motor-type winding in the rotor in addition to the repulsion-motor winding. Its speed characteristic, therefore, is a combination of the varying speed characteristic of the repulsion motor together with the substantially constant speed characteristic of an induction motor. It has the operating characteristics of a repulsion motor on starting and coming up to speed, and smoothly and automatically assumes the operating characteristics of an induction motor when its speed approaches synchronous speed. It, therefore, has the high starting torque of the repulsion motor and the good speed regulation of an induction motor.

This motor has desirable operating characteristics, but it has fallen into disuse and has practically become obsolete because of the high maintenance cost of the alternating-current commutator. This invention provides a motor having operating characteristics comparable to those of a repulsion-induction motor without the use of a commutator.

An object of this invention is to provide an alternating-current motor which has operating characteristics comparable to those of a repulsion-induction motor without using a commutator.

Another object is to provide an alternating-current motor having the aforementioned characteristics which utilizes a magnetic device of relatively economical construction for accomplishing the function of commutation.

A further object is to provide a system of control for an alternating-current motor having the aforementioned characteristics which provides sensitive control from standstill through a range of intermediate speeds to full speed, and is easily electrically reversed.

In accordance with this invention an alternating-current motor is provided which has operating characteristics which substantially resemble, and are comparable to, those of the classical repulsion-induction motor. A rotating single-phase primary winding and a stationary continuous secondary winding are provided. The secondary winding has a number of tapped connections. An odd number of diametrical circuits are connected between these taps. Each of these circuits includes a saturable reactor and a rectifier. The rectifiers in adjacent circuits are arranged to pass current in opposite directions.

A control winding activated by the voltage induced between another pair of taps is associated with each reactor. These control windings provide the current distribution corresponding to that provided in the classical repulsion motor by the displacement of the brush axis from the primary winding axis. This control circuit may be, therefore, designated a commutation control circuit. This current distribution produces the starting torque.

A resistor is shunted across each rectifier to provide a negative-voltage feedback control circuit to counteract undesired cross currents.

To have the motor current quickly and accurately respond to the control current, a negative-current feedback control circuit is provided. This negative feedback is overpowered by the control current in the external control circuit. This enables the motor current to quickly and accurately adjust itself to correspond to the control current.

An external control circuit superimposed upon all of the saturable reactor control circuits provides a means for suppressing or varying the effectiveness of the other control circuits. If the bias introduced by the external control circuit is strongly negative, it makes the other control ineffective. All the reactors, therefore, act as open circuits. No secondary currents then flow and the motor develops no torque. If the bias is gradually made positive, the torque increases. Full repulsion motor operation is reached when the bias is approximately zero. If the bias is then further increased to a positive maximum, the other controls again become ineffective and all the reactors act like short circuits. The motor then becomes a single-phase induction motor with a short-circuited secondary. By gradually increasing the bias from zero to a positive maximum, it is thus possible to change the operating characteristics smoothly and continuously from low speed as a repulsion motor to high speed as an induction motor.

Reversal is accomplished by providing a combined bias and commutation control for each direction of rotation. Each control for a given direction of rotation is connected in series opposition with the control for the opposite direction of rotation. For forward rotation the forward control is biased positive, and the reverse control is biased negative. For reverse operation the controls are biased in reverse. The forward and reverse bias controls may be readily operated by remote signals which may be transmitted, for example, by radio.

Other objects and advantages of the present invention will become apparent to one skilled in the art from a reading of the following specification in conjunction with the accompanying drawings of illustrative examples constructed according to the teachings of the present invention, in which:

Fig. 1 is a schematic diagram of a unidirectional alternating-current motor and control system which is an illustrative embodiment of this invention, and Fig. 2 is a schematic diagram of an alternating-current control motor and control system of a reversible alternating-current motor which is another illustrative embodiment of this invention.

In Fig. 1 is shown an alternating-current motor having a rotor 10 carrying a primary winding 11 which is fed from a single-phase A.-C. power supply provided between lines 12 and 14. The rotor is connected to these power-supply lines through collector rings 16 and 18 and respective brushes 20 and 22. These collector rings are joined to the rotor winding at diametrically opposed taps 26 and 28. The stator 30 carries a secondary winding 31 which is tapped to be connected to a number of diametrical circuits. Each of these circuits includes a saturable reactor 32 with a single wound core (not shown) and a rectifier 34. To simplify the diagrams the cores of the saturable reactors are not shown and the direct-current control windings are represented by a single turn. These rectifiers are arranged to pass current in opposite directions or are of alternating opposite polarity in the successive circuits.

The angle between these successive or multiple circuits is 180 electric degrees divided by an odd number such as 3, 5 or 7. This provides angles respectively of 60, 36 or 25.7 degrees. An odd number must be used as the basis of this arrangement because the sequence of alternate and positive taps must repeat itself with opposite signs in the second 180°. In this illustrative embodiment 5 circuits are provided which are connected to winding taps spaced 36 electrical degrees apart. This provides an ampere-turn distribution which corresponds to an ideal repulsion motor where the brushes are shifted to make the angle between stator and rotor axes 36°.

For convenience, the individual circuits will be designated as circuits 1, 2, 3, 4 and 5. Each circuit includes a saturable reactor 32. The individual saturable reactors 32 are designated by a subscript to indicate the circuit within which they are included. For example, $32_1$ designates the saturable reactor in circuit 1 while $32_2$ designates the saturable reactor in circuit 2 and so forth. Other elements common to circuits 1 to 5 are similarly designated by reference characters common to the elements having subscripts which indicate the circuit in which the element is connected. Each of the circuits also includes a rectifier 34. In accordance with this scheme of notation, they are designated as rectifiers $34_1$ to $34_5$. A shunt 36 is connected in each circuit to provide a by-pass about the rectifier. The voltage feedback function of this shunt to counteract crosscurrents is later explained.

A control winding 38 is provided for each of the saturable reactors. It is connected to the winding taps immediately preceding the taps across which the reactor circuit itself is connected. For example, the control widing $38_2$ in connected across the taps for circuit 1. The control winding $38_3$ is connected across the taps for circuit 2. A resistor 40 is connected in series with these commutating control windings to limit the current flow.

A control winding 42 for negative-current feedback is provided for each of the saturable reactors. These negative-current feedback control windings are continuously connected in series. This series circuit is connected to derive its current from a current transformer 44 with rectifiers 46 and 48 providing full-wave rectification.

An external-control winding 50 is provided for each of the saturable reactors. These external-control windings are also connected in series. The external-control series circuit is connected to a potentiometer bridge 52, which may be of the slidewire type, which is connected across a positive to negative direct-current source of potential. A resistor 54 is connected in series with the variable tap of the potentiometer to limit the current flow. This potentiometer provides a means for varying the polarity of the external control bias to vary the operating characteristics of the motor from those of a repulsion motor to those of an induction motor.

These circuits may be regulated to produce an ampere-turn distribution which substantially resembles that found in the classical repulsion motor. At higher speeds, the current through the control windings may be regulated to a current distribution through the stator winding and diametrical circuits to substantially resemble that of an induction motor.

At lower speeds, in the place of the single short circuit through the brushes provided by the classical repulsion motor, the magnetic reactor paths provide multiple paths of partial short circuits. Cross currents which are the principal difficlulty in the operation of commutator motors would be excessive in these multiple paths if these short circuits were complete. The current in these multiple paths is regulated to produce a distribution of ampere-turns and a resulting torque which is substantially the same as in the classical repulsion motor. The saturable reactors $32_1$ to $32_5$ regulate the rise and fall of current to produce the desired ampere-turn distribution. Although complete magnetic amplifiers having two wound cores and two rectifier elements may be used in these paths, each path in this illusrative embodiment includes only one winding (core not shown) and one rectifier element. This provides a simple and economical arrangement. The rectifier elements are alternately positive and negative in successive paths. Alternate circuits, therefore, carry current on positive and negative half waves. The direct-current components thus flowing through the windings largely neutralize each other, and the residual unneutralized components do not interfere with the operation of the motor.

In an illustrative position of the rotor shown in Fig. 1, the primary axis is in phase with the stator tap 1. The effective currents for proper repulsion motor operation then have the following relative values in the five multiple circuits respectively: ½, 1, ½, 0, and 0. This places the center of gravity of the ampere-turns on tap 2 which is displaced 36° from the primary axis. In another illustrative position of the rotor its primary axis is displaced 18° from tap 1. The currents respectively in the five multiple circuits are: 1, 1, 0, 0, and 0. The saturable reactors $32_1$ and $32_5$ must be controlled to provide a correct current distribution for every position of the rotor. The undesired cross currents must be counter acted to accomplish this.

Referring too the first described rotor position as shown in Fig. 1, a relatively high voltage is induced in the stator winding at tap 1 and a relatively low voltage is induced at tap 3. The proper current distribution, however, calls for equal currents to flow through circuits 1 and 3. To achieve this current distribution, the reactance of circuit 1 must be relatively high and the reactance of circuit 3 relatively low. The reactance of self-saturating saturable reactors $32_1$ to $32_5$ is determined by the resulting magnetizing ampere turns of the control and feedback windings during the half cycle when the main winding does not carry current. Tap 1 carries a relatively higher voltage than tap 3. The necessary higher reactance in circuit 1 is produced by a negative feedback from the voltage of tap 1. The control current must overcome this negative feedback before the saturation is reached which causes current to flow. For the same reason circuit 3 presents a low reactance. The control current for the negative-voltage feedback flows through the main reactor winding during the negative half waves when the current is blocked by the rectifiers $34_1$ to $34_5$. Resistors $36_1$ to $36_5$ provide a shunt path around each rectifier element. The shunts $36_1$ and $36_5$, therefore, provide this negative-voltage feedback.

The negative-current feedback windings $42_1$ and $42_5$ provide ampere turns derived from the current flowing in the primary winding. The control current must also overpower this negative-current feedback. This current flow causes the rotor current to quickly and accurately adjust itself to correspond to the control current. The control of any one reactor should repeat itself after each 180° turn of the rotor. This reverses the induced voltage in the secondary rotor winding which, therefore, must carry current on the negative half wave of the primary. The feedback current is, therefore, passed through a current transformer and a two-wave rectifier so that both half waves of the primary produce the desired negative-control effect on the reactor.

The commutation control which provides the proper distributiton of ampere turns in the stator winding for repulsion motor operation is provided by means of the commutation control windings $38_1$ to $38_5$. For each saturable reactor $32_1$ to $32_5$ the control voltage is derived from taps on the winding adjacent to the taps for the particular reactor circuit. This displaced angle corresponds to the brush shift in the repulsion motor. The current provided by the commutation control is alternating. For each reactor, the commutating control current is derived from a pair of winding taps displaced 36 electrical degrees from the taps to which the particular reactor circuit is connected. Resistors $40_1$ to $40_5$ in series with the control windings $38_1$ to $38_5$ respectively limit the current. It should be noted that only the positive half wave of the commutating control current has any effect. The commutation control, therefore, overpowers the negative controls in the circuits where power current is desired utilizing the positive half waves to produce this effect. The negative half waves only add to the current suppressing effect of the other negative controls. This commutation system operates effectively for the non-reversible motor illustrated in Fig. 1.

The external control windings $50_1$ to $50_5$ control the saturable reactors to determine the torque and speed characteristics of the motor. These control windings are arranged in series as illustrated in Fig. 1. The function of the external control is to superimpose a bias of ampere turns on the ampere turns of the other controls. When the variable tap on potentiometer 52 is moved towards the negative side, it makes the bias provided by the external control winding $50_1$ and $50_5$ strongly negative. It, therefore, makes all of the other controls ineffective. All the reactors then act as open circuits. No secondary currents flow and the motor develops no torque. If the negative bias is gradually reduced by placing the variable tap at a position intermediate the positive and negative ends of the bridge, for example point 56, the other controls are allowed to take effect. The commutating control windings carry the control currents which shift the magnetic axis of the stator to provide torque. Full repulsion-motor operation is reached when the bias provided by the external control windings is reduced to zero to allow the commutating windings to operate at full effectiveness.

If the potentiometer is then set at point 58 which is at the positive end, the other controls again become ineffective. The reactors all conduct and act like short circuits. The motor thus becomes a single-phase induction motor with a short-circuited secondary.

By gradually increasing the bias from zero to a positive maximum, it is thus possible to change the operation smoothly and continuously from low speed as a repulsion motor to a higher speed as an induction motor. The single-phase induction motor has no starting torque whereas the repulsion motor has high torque at standstill and low speeds. Controlling the bias provided by the external control winding from full negative to full positive, therefore, provides complete control of the starting torque, low-speed operation and high-speed operation.

In Fig. 2 is shown a schematic diagram of an alternating-current motor which provides the operating characteristics of the motor shown in Fig. 1, and furthermore is reversible. Parts in Fig. 2 identical to parts in Fig. 1 are designated by the same reference characters with a suffix "$a$." A rotor $10a$ carrying a primary winding $11a$ and a stator $30a$ carrying the secondary winding $31a$ are provided. The rotor and stator windings are identical to those shown in Fig. 1. Reactor circuits $1a$ to $5a$ across taps $1a$ to $5a$ are provided identical to those shown in Fig. 1. They include the same saturable reactors $32a$, rectifiers $34a$, shunted resistors $36a$ around the rectifiers and negative-feedback control windings $42$. A forward commutation control winding $38a$ is provided for each of the saturable reactors. A reverse commutation control winding $60$ is also provided for each saturable reactor. The winding taps for each saturable reactor are led to a common neutral $62$ provided between the midpoints of potentiometers $64$ and $66$ which may be the slide wire type. Resistors $68_1$ to $68_5$ are provided in the line connecting the individual circuits to the neutral. For example, resistor $68_5$ is connected to the line leading to saturable reactor circuit 5. The forward commutation control windings $38a_1$ to $38a_5$ are connected at one end thereof to an adjacent winding tap of the preceding circuit through current limiting resistors $40a_1$ $40a_5$. The reverse commutation control windings $60_1$ to $60_5$ are connected to a tap on the saturable reactor circuit in a reverse direction through resistors $60_1$ to $61_5$. The forward and reverse commutation windings are connected in series opposition at the taps to common adjacent circuits.

The input side to the forward commutation control windings is connected to a common line 69. This line is connected through the variable tap 70 to potentiometer 64. A resistor 65 in series with the variable tap limits current flow. The potential from potentiometer 64 is introduced into these windings through rectifiers $72_1$ to $72_5$. The reverse commutation control windings receive their input from a common line 74. This common line is connected to the variable tap 76 of the potentiometer 66. A resistor 67 is connected in series with variable tap 76. The potential supplied by potentiometer 66 is connected to the reverse commutation coils through rectifiers $78_1$ to $78_5$.

The rotor $10a$ is energized in the same manner shown in Fig. 1. Voltage-feedback shunts $36a_1$ to $36a_5$ are provided in common for both forward and reverse operation. Negative-current feedback windings $42a_1$ to $42a_5$ are also provided in common for both forward and reverse operation. These negative-current feed-back control windings are energized through transformer $44a$ in a manner similar to that shown in Fig. 1. The voltage-feedback and negative-feedback controls are, therefore, identical to those shown in Fig. 1.

The external control circuit is provided by the two independent direct-current potentials provided potentiometers 64 and 66. The external control or bias is applied through the opposed commutation windings. According to the direction of the rotation one commutation winding is biased positive to be activated while the other is biased negative to be inactivated.

The external-control circuit potentiometers are used to reverse the direction of rotation. The control by these potentiometers is equivalent to reversal of direction of rotation of a classical repulsion motor by shifting the brush axis. The forward and reverse commutation windings are connected in series opposition. The external potentials are introduced into the input side of the windings. The external bias, therefore, activates or deactivates the preselected commutation control. When the bias control for forward operation is used, the bias for reverse is set on full negative. The external control, therefore, consists of two independent direct-current potentials leading from the neutral to the two common lines of the two control systems. Either of the two control systems can be suppressed by bucking the direct-current voltage against the rectifier in its circuit. An external remote control is, therefore, provided which gives a continuous regulation of the torque at standstill and a low speed in a similar manner to that shown in Fig. 1. At the same time a full range of control from full speed forward to full speed in reverse is provided. When the forward commutation windings are activated by being provided with a positive potential from potentiometer 64, the reverse commutation windings are deactivated by being provided with a negative potential from the potentiometer 66.

This motor control provided by the potentiometers may be readily activated by remote signals which may be transmitted by radio. A motor without a commutator suitable for servomechanisms such as gun control and steering control is thus provided. The motor is economically designed because only 5 reactors and 5 rectifier elements are necessary in each of the circuits. These reactors and rectifiers need be designed only to carry full current ⅕ of the time.

What is claimed is:

1. An alternating-current motor comprising a rotatable single-phase primary winding, a stationary secondary winding, tap connections to said secondary winding, an odd number of circuits connected between said winding taps, a saturable reactor in each of said circuits, a rectifier in each of said circuits, said rectifiers being arranged to pass current in opposite directions in adjacent circuits, a control winding operatively associated with each reactor, and said control winding being connected between a pair of said taps displaced from the taps across which its reactor is connected.

2. An alternating-current motor comprising a rotatable single-phase primary winding, a stationary secondary winding, tap connections to said secondary winding, an odd number of circuits connected between said winding taps, a saturable reactor in each of said circuits, a rectifier in each of said circuits, said rectifiers being arranged to pass current in opposite directions in adjacent circuits, a control winding operatively associated with each reactor, said control winding being connected between a pair of said taps displaced from the taps across which its reactor is connected, and variable polarity control means operatively associated with each of said reactors for varying the speed and torque characteristics of said motor by varying the effectiveness of said control windings.

3. An alternating-current motor comprising a rotatable single-phase primary winding, a stationary secondary winding, tap connections to said secondary winding, an odd number of circuits connected between said winding taps, a saturable reactor in each of said circuits, a rectifier in each of said circuits, said rectifiers being arranged to pass current in opposite directions in adjacent circuits, a control winding operatively associated with each reactor, said control winding being connected to derive its voltage between a pair of said taps displaced from the winding taps associated with its reactor winding, and biasing means operatively associated with said control windings for varying the effectiveness of said control windings to vary the speed and torque characteristics of said motor.

4. An alternating-current motor comprising a rotatable primary winding, a stationary secondary winding, tap connections to said secondary winding, an odd number of circuits connected between said winding taps, a saturable reactor in each of said circuits, a rectifier in each of said circuits, said rectifiers being arranged to pass current in opposite directions in adjacent circuits, a set of control windings operatively associated with each of said reactors, said set of control windings being connected to derive its voltage from winding taps displaced in a predetermined direction from the winding taps across which its reactor is connected, a second set of control windings operatively associated with each reactor, said second set of control windings being connected to derive its voltage from winding taps displaced in a direction opposite to said predetermined direction from the winding taps across which its reactor is connected, and variable polarity means connected to each of said sets of control windings for varying the effectiveness of said control circuits to vary the speed and torque characteristics of said motor and the direction of rotation of said motor.

5. An alternating-current motor comprising a rotatable single-phase primary winding, a stationary secondary winding, tap connections to said secondary winding, an odd number of diametrical circuits connected between said winding taps, a saturable reactor in each of said diametrical circuits, a rectifier in each of said circuits, said rectifiers being arranged to pass current in opposite directions in adjacent circuits, a shunt around each of said rectifiers to provide voltage feedback for eliminating cross-currents, a control winding operatively associated with each reactor, and each of said control windings being connected between a pair of said taps displaced from the taps across which its said reactor is connected.

6. A motor for operation from an A.-C. power supply comprising a rotatable single-phase primary winding, a stationary secondary winding, tap connections to said secondary winding, an odd number of diametrical circuits connected between said winding taps, a saturable reactor in each of said diametrical circuits, a rectifier in each of said circuits, said rectifiers being arranged to pass current in opposite directions in adjacent circuits, a commutating control winding operatively associated with each reactor, said commutating control winding being connected to said taps displaced from the taps across which its reactor is connected, a negative-current feedback winding operatively associated with each reactor, and said negative-current feedback windings being connected to said A.-C. power supply to oppose said commutating control windings for causing said reactor current to quickly and accurately respond to said commutating control current.

7. An alternating-current motor and control system comprising a rotatable single-phase primary winding, a stationary secondary winding, tap connections to said secondary winding, an odd number of diametrical circuits connected between said winding taps, a saturable reactor in each of said diametrical circuits, a rectifier in each of said circuits, said rectifiers being arranged to pass current in opposite directions in adjacent circuits, a control winding operatively associated with each reactor, said control winding being connected to taps displaced from the taps across which its reactor is connected, variable polarity control means operatively associated with each of said reactors for varying the bias on said control windings from full negative voltage to full positive voltage, said variable polarity control means being arranged to substantially open circuit said reactors at full negative, and said variable polarity control means being arranged to substantially short circuit said reactors at full positive voltage.

8. An alternating-current motor and system of control comprising a rotatable primary winding, a stationary secondary winding, tap connections to said secondary winding, an odd number of circuit connections between said winding taps, a saturable reactor in each of said circuits, a rectifier in each of said circuits, said rectifiers being arranged to pass current in opposite directions in adjacent circuits, a set of control windings operatively associated with each of said reactors, said set of control windings being connected to derive its operating voltage from preselected winding taps displaced in predetermined directions from the winding taps across which its reactor is connected, and means for preselecting said winding taps across which said voltage is derived to vary the direction of rotation of said motor.

9. An alternating-current motor and system of control comprising a rotatable primary winding, a stationary secondary winding, tap connections to said secondary winding, an odd number of circuit connections between said winding taps, a saturable reactor in each of said circuits, a rectifier in each of said circuits, said rectifiers being arranged to pass current in opposite directions in adjacent circuits, a set of control windings operatively associated with each of said reactors, said set of control windings being connected to derive its voltage from winding taps displaced in a predetermined direction from the winding taps across which its reactor is connected, a second set of control windings operatively associated with each reactor, said second set of control windings being connected to derive its voltage from winding taps displaced in a direction opposite to said predetermined direction from the winding taps across which its reactor is connected, a rectifier in each of said control windings, and variable polarity input means connected to each of said sets of control windings for varying the effectiveness of each of said control circuits to vary the speed and torque characteristics of said motor and the direction of rotation of said motor.

No references cited.